(12) United States Patent
Lai et al.

(10) Patent No.: US 8,293,418 B2
(45) Date of Patent: Oct. 23, 2012

(54) FUEL SUPPLY CONTROL METHOD AND SYSTEM FOR FUEL CELLS

(75) Inventors: Chiou-Chu Lai, Hsinchu County (TW); Bin-Chen Wei, Taipei County (TW); Shih-Hao Liang, Taipei County (TW); Yin-Wen Tsai, Taipei County (TW)

(73) Assignee: Industrial Technology Research Institute, Hsinchu (TW)

( * ) Notice: Subject to any disclaimer, the term of this patent is extended or adjusted under 35 U.S.C. 154(b) by 515 days.

(21) Appl. No.: 12/615,203

(22) Filed: Nov. 9, 2009

(65) Prior Publication Data

US 2010/0055515 A1    Mar. 4, 2010

Related U.S. Application Data

(63) Continuation-in-part of application No. 11/437,100, filed on May 19, 2006.

(30) Foreign Application Priority Data

Jun. 16, 2005    (TW) .............................. 94119975 A

(51) Int. Cl.
*H01M 8/04* (2006.01)
(52) U.S. Cl. ......... 429/442; 429/429; 429/433; 429/443
(58) Field of Classification Search .................. 429/428, 429/433, 434, 442, 443, 448
See application file for complete search history.

(56) References Cited

U.S. PATENT DOCUMENTS

| | | | |
|---|---|---|---|
| 6,383,670 B1 | 5/2002 | Edlund et al. | |
| 6,410,175 B1 | 6/2002 | Tillmetz et al. | |
| 6,488,837 B1 | 12/2002 | Ren et al. | |
| 6,589,671 B1 | 7/2003 | Kehrer | |
| 6,589,679 B1 | 7/2003 | Acker et al. | |
| 6,698,278 B2 | 3/2004 | Zhang et al. | |
| 6,777,116 B1 | 8/2004 | Muller et al. | |
| 2002/0076589 A1 | 6/2002 | Bostaph et al. | |
| 2002/0122966 A1* | 9/2002 | Acker et al. | 429/24 |
| 2003/0110841 A1* | 6/2003 | Zhang et al. | 73/61.76 |
| 2004/0001989 A1 | 1/2004 | Kinkelaar et al. | |
| 2004/0247963 A1* | 12/2004 | Akiyama et al. | 429/22 |

FOREIGN PATENT DOCUMENTS

WO    WO 01/35478    5/2001

* cited by examiner

*Primary Examiner* — Patrick Ryan
*Assistant Examiner* — Muhammad Siddiquee

(57) ABSTRACT

An embodiment of the invention provides a fuel supply control system to control a fuel cell system to work in a predetermined temperature range by controlling a fuel supply rate. The fuel supply control system includes a fuel supply controller and a fuel supply device. The fuel supply controller calculates a temperature variation slope to generate a first fuel supply rate by increasing or decreasing the predetermined fuel supply rate according to the relationship of system temperature and predetermined working temperature, and controls a fuel delivering rate of the fuel supply device according to the first fuel supply rate.

9 Claims, 3 Drawing Sheets

FUEL SUPPLY CONTROL METHOD AND SYSTEM FOR FUEL CELLS

CROSS REFERENCE TO RELATED APPLICATIONS

This application is a continuation-in-part of U.S. patent application Ser. No. 11/437,100, filed May 19, 2006, which claims the priority benefit of Taiwan application serial no. 94119975, filed Jun. 16, 2005, the entire contents of which are herein incorporated by reference.

BACKGROUND OF THE INVENTION

1. Field of the Invention

The invention relates to a liquid fuel direct oxidation fuel cell, especially, direct methanol fuel cell (DMFC) and in particular to a fuel supply control method for a fuel cell system, controlling fuel supply rate to fuel unit to maintain the fuel cell operating at acceptable lowest fuel concentration according to control a system temperature of the fuel cell system.

2. Description of the Related Art

As fuel is consumed in a liquid fuel direct oxidation fuel cell, not only volume but concentration of the fuel is decreased, with optimum, operation requiring control the system operate at lowest acceptable fuel concentration and appropriate temperature.

Conventional fuel supply methods for fuel cells, such as those disclosed in U.S. Pat. Nos. 6,589,671B1, 6,488,837, US2002/076589A1, and WO01/35478, supply fuel or water according to fuel concentration measured from a fuel cell. Another fuel supply method for fuel cells, disclosed by Ballard Power in U.S. Pat. No. 6,698,278B2, the fuel concentration was calculated using fuel input and output stream temperature and electrical current measured from a fuel cell. For these control method, accurate fuel concentration measurement or estimation is the basic requirement for controlling the system to operate at suitable fuel concentration. The fuel supply amount is calculated from the concentration discrepancy.

FIG. 1 is a block diagram of a conventional fuel cell 10 comprising a fuel supply control system 11, a fuel cell module 111, a pump 112, and a fuel unit 118 storing fuel with concentration maintained within a certain range. Pump 112 delivers the fuel to fuel cell module 111 for reaction with an anode.

Fuel supply control system 11 controls fuel concentration in fuel unit 118, and comprises a concentration meter 117, a controller 115, and a fuel supply device 12. Concentration meter 117 detects fuel concentration in fuel unit 118. Controller 115 calculates the difference between the measured concentration and a standard concentration, and drives fuel supply device 12 to deliver high concentration fuel to fuel unit 118 according to the calculated fuel amount from concentration difference, such that fuel concentration in fuel unit 118 is maintained at a standard.

Fuel supply device 12 comprises a fuel tank 113 storing high concentration fuel and a fuel deliver device 114 delivering fuel from fuel tank 113 to fuel unit 118. In other designs, a water tank or a fuel tank storing low concentration fuel may be required if fuel concentration in fuel tank 113 is too high. However, in general, recycled water from a cathode unit of the fuel cell system is sufficient for the same function.

Devices for detection of the fuel concentration suffer: difficulty in achieving accuracy and high cost. For example, apparatus disclosed in U.S. Pat. No. 6,589,679 utilizes another fuel cell to measure the fuel concentration in a main fuel cell, whereby various factors, such as temperature change, impurities in fuel, and age of devices, may affect measurement accuracy. That disclosed by Ballard Power provides another solution in the field, although complex functions must be generated based on experiments with various sizes of fuel cell systems, with function varying in every system design. Accurate fuel concentration in such complex systems is a challenge. However, the environment condition will affect the fuel cell output power when fuel cell system was controlled at a specific concentration. Therefore, a method to control the system operating at lowest acceptable concentration and maximum output power with higher fuel efficiency was developed.

BRIEF SUMMARY OF THE INVENTION

An embodiment of the invention provides a fuel supply control system to control a fuel cell system to work in a predetermined temperature range by controlling a fuel supply rate. The fuel supply control system comprises a first thermal meter, a fuel supply device and a fuel supply controller. The first thermal meter detects a system temperature of the fuel cell system. The fuel supply device comprises a fuel tank storing highly concentrated fuel and a fuel deliver device delivering the highly concentrated fuel by a predetermined fuel supply rate from the fuel tank to a fuel unit of the fuel cell system to replenish the consumption fuel during operation thereof. The fuel supply controller calculates a temperature variation slope to generate a first fuel supply rate by increasing or decreasing the predetermined fuel supply rate according to the relationship of system temperature and predetermined working temperature, and controls a fuel delivering rate of the fuel supply device according to the first fuel supply rate.

Another embodiment of the invention provides a fuel supply control method to control a fuel cell system to work in a predetermined temperature range by controlling a fuel supply rate, wherein the fuel cell system comprises a fuel supply device comprising a fuel tank storing highly concentrated fuel and a fuel deliver device delivering the highly concentrated fuel from the fuel tank to a fuel unit of the fuel cell system to replenish the consumption fuel during operation thereof. The fuel supply control method comprises: setting a predetermined fuel supply rate; setting a predetermined working temperature; detecting a system temperature of a fuel cell system; calculating a temperature variation slope of the system temperature; generating a first fuel supply rate by increasing or decreasing a predetermined fuel supply rate according to the temperature slope and the relationship of system and predetermined temperature; controlling a fuel delivering rate of the fuel supply device according to the first fuel supply rate.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

In a fuel cell system, such as direct methanol fuel cell if fuel concentration is low, fuel crossover rate through the membrane from anode to cathode side is correspondingly low, such that the fuel utilization will increase, the temperature of the fuel cell will dominated by the fuel cell electronic conversion loss. As fuel concentration increases, combustion reaction in the cathode side within the fuel cell increases due to more fuel crossover and thermal energy is released such that the temperature of the fuel cell increases. A system temperature of the fuel cell, at which the fuel cell operates at optimum, is set as a predetermined temperature. When the system temperature of the operating fuel cell is not equal to the predetermined temperature, fuel supply rate to the fuel unit of fuel cell is adjusted to alter the fuel concentration such that the system temperature is maintained at the predetermined temperature. Typically, the fuel cell had better operated at a suitable operating temperature to manage their water and methanol loss, and in turn, fuel concentration of the fuel in fuel cell, require no limitation to a precise value but wish to control at a lowest acceptable value. A range with an upper and a lower limit of the predetermined temperature can also be determined. When temperature of the fuel cell is beyond the range, the fuel supply rate must be adjusted.

Figure 1:
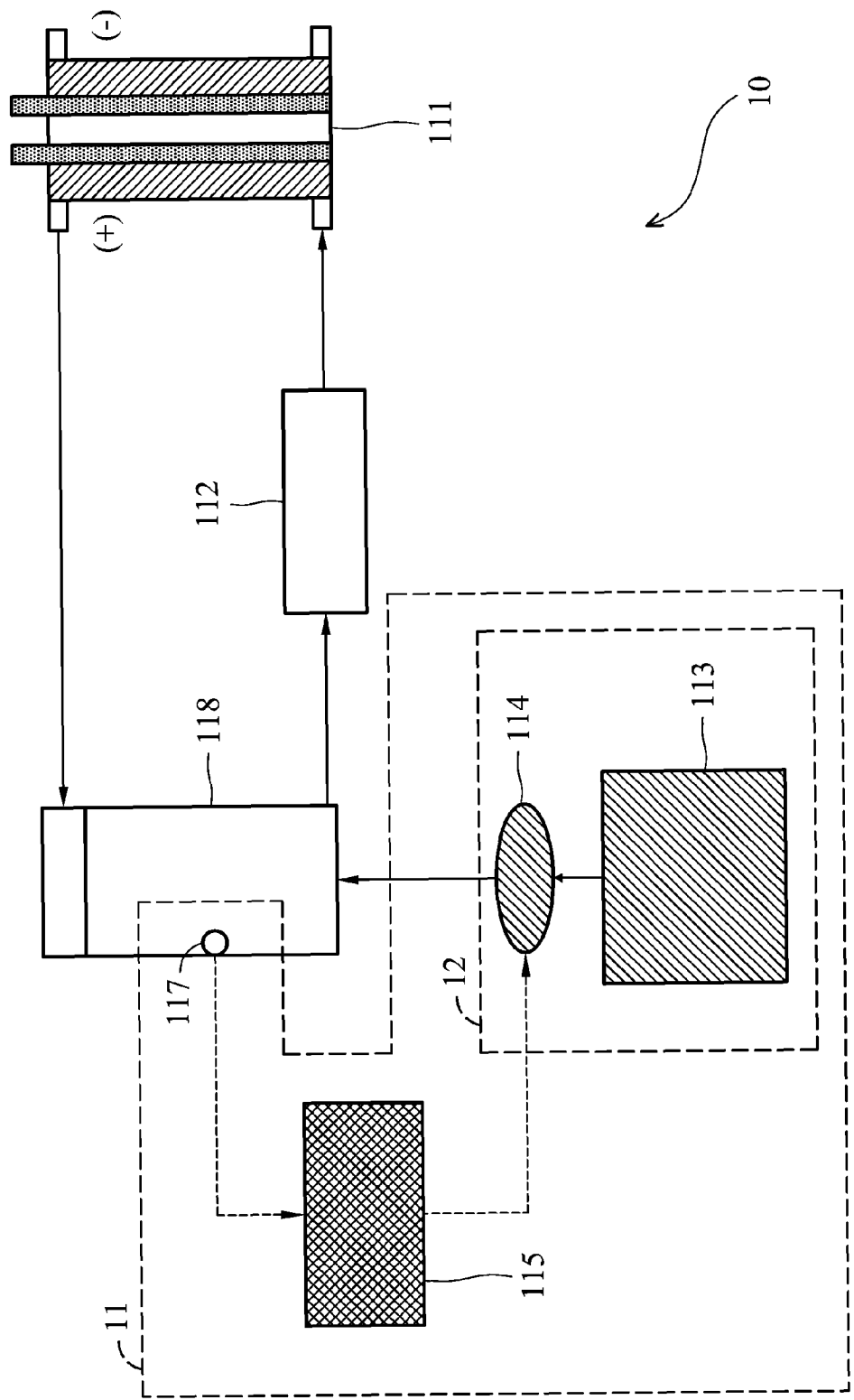
FIG. 1 is a block diagram of a conventional fuel cell.
Figure 2:
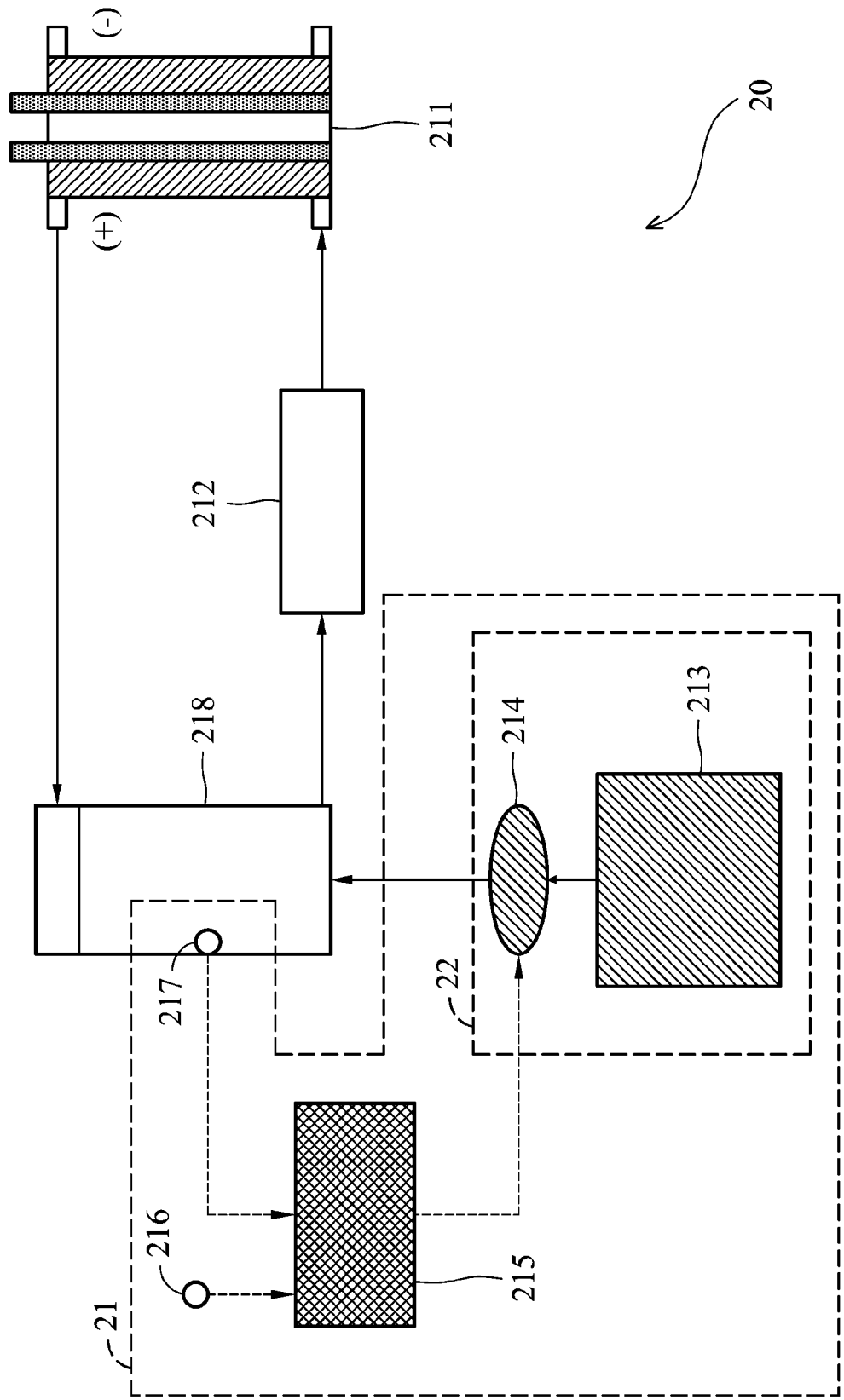
FIG. 2 is a block diagram of a fuel cell according to an embodiment of the invention.

FIG. 2 is a block diagram of a fuel cell 20 according to an embodiment of the invention, comprising a fuel supply control system 21, a fuel cell module 211, a pump 212, and a fuel unit 218 storing mixed fuel, concentration of which is determined by the operation temperature and output power and environment temperature automatically. Pump 212 delivers the fuel to fuel cell module 211 for reaction with an anode.

Fuel supply control system 21 controls fuel supply rate of fuel delivery device 214 to fuel unit 218 to maintain the system to operate at a predetermined temperature range, and comprises a first thermal meter 217, a controller 215, and a fuel supply device 22. First thermal meter 217 detects a system temperature in fuel unit 218. Fuel supply device 22 comprises a fuel tank 213 storing highly concentrated fuel and a fuel deliver device 214 delivering the fuel from the fuel tank 213 to the fuel unit 218. The fuel circulation pump 212 feeding the mixed fuel of fuel unit 218 to anode and return to fuel unit after reaction. There can be another water storage or recycling tank stores reacted water and supply water to fuel unit 218 for reaction through a pump. (not shown here) The water supply rate can be a predetermined constant speed or control by a level sensor to keep the fuel unit has enough fuel.

Controller 215 provides a predetermined fuel supply rate in the initial to fuel that system for maintaining the operation, calculates a system temperature variation slope, generates a first fuel supply rate by adjusting the predetermined fuel supply rate according to the temperature slope and the relationship of system and predetermined temperature, and drives the fuel deliver device 22 to deliver highly concentrated fuel to fuel unit 218 according to the first fuel supply rate, such that fuel cell temperature in fuel unit 118 is modified to maintain at expected range.

Controller 215 can utilize an analog-to-digital converter (not shown) to convert a voltage signal of the first thermal meter 217 to a system temperature reading, and a subtractor or other logic device (not shown) to calculate the velocity. The predetermined temperature can be set between 40° C. and 80° C., according to operational conditions of the fuel cell 20.

Controller 215 can further comprise a warm up procedure. When the system starts up, system temperature is below the predetermined target temperature, the controller 215 increases the fuel supply rate to generate a first fuel supply rate to keep the temperature variation slope positive or higher than a predetermined value for increasing the temperature to approach to predetermined temperature. When the system temperature near the predetermined temperature range, adjust the first fuel supply rate according the temperature variation slope combined with the relation between system temperature and target temperature to keep the system temperature within the predetermined temperature range.

Controller 215 can further comprise upper and lower limits for the predetermined temperature to keep the fuel supply rate when the system temperature is within the upper and lower limits. The first velocity is generated by decreasing the predetermined fuel supply rate when the temperature exceeds the upper limit or predetermined temperature and the temperature variation slope is positive; and by increasing the predetermined fuel supply rate when the temperature is lower than the lower limit or predetermined temperature and temperature variation slop is negative. Theoretically, when the upper and lower limit is within 10° C., the fuel cell system can operate within specification. Experimental data shows optimum fuel cell operating temperature between 60° C. and 70° C., and the optimum range is below +/−5° C.

Fuel cell system can further comprise a water tank and a water delivery device to supply water to fuel unit to maintain fuel concentration and fuel level. The water supply rate can be determined by current or fuel level of fuel unit (not shown in FIG. 2).

Fuel supply control system 21 can further comprise a second thermal meter detecting an environmental temperature of the fuel cell, with the predetermined temperature set to exceed the environmental temperature by at least 10° C.

By implementing embodiments according to the invention, the system temperature of the fuel cell can be maintained for optimum performance of the fuel cell and the fuel concentration of the fuel cell system can be controlled at an acceptable lowest value. In a fuel cell system, the system temperature can be the temperature of the Fuel cell module 211, the fuel unit 218 or any other temperature can represent the fuel cell temperature.

Figure 3:
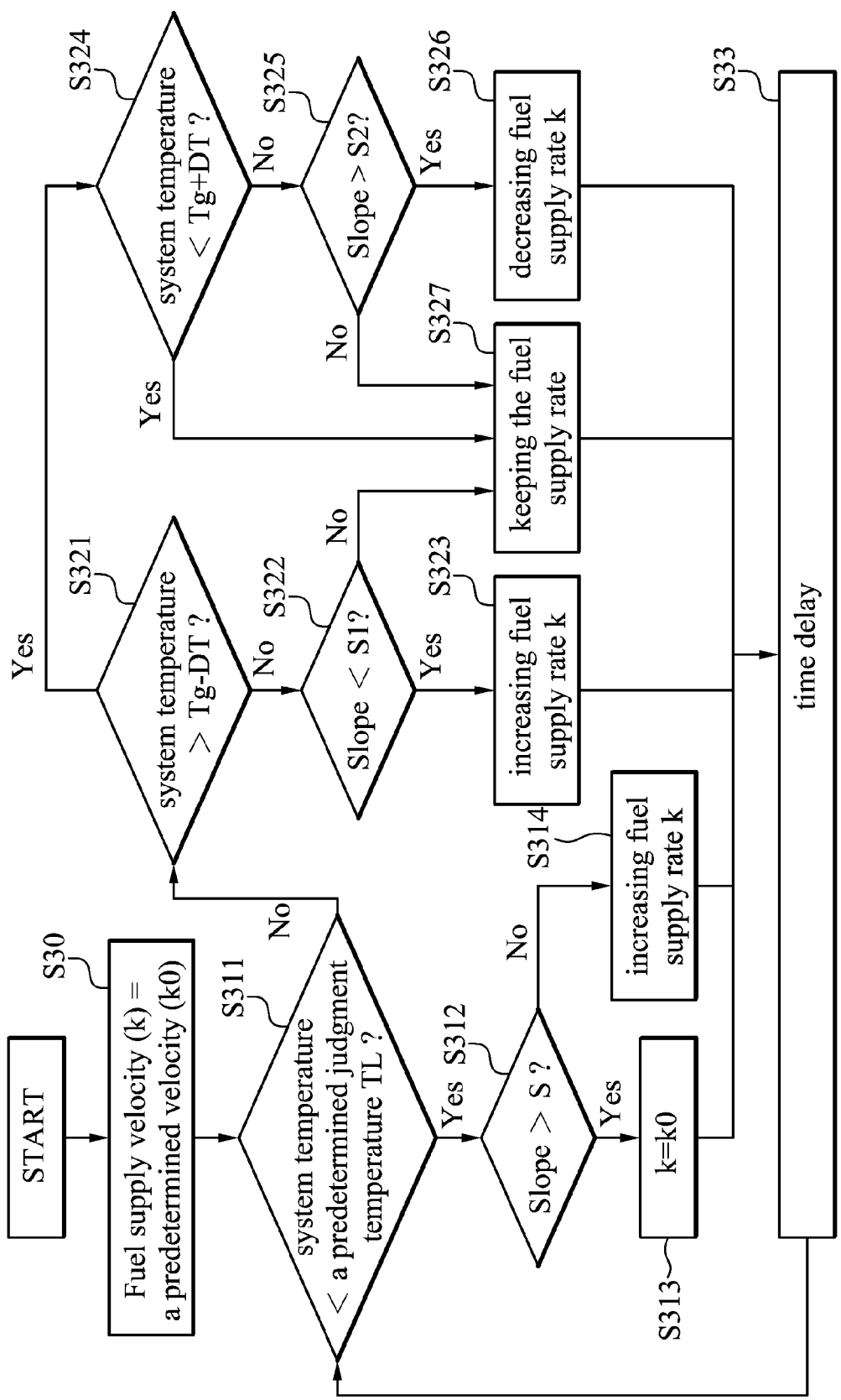
FIG. 3 is a flowchart of an embodiment of fuel supply control method according to the invention.

FIG. 3 is a flowchart of an embodiment of fuel supply control method according to the invention. The fuel supply control method to control a fuel cell system to work in a predetermined temperature range by controlling a fuel supply rate. The fuel supply control system comprises a first thermal meter, a fuel supply device and a fuel supply controller with a predetermined fuel supply rate. The first thermal meter detects a system temperature of the fuel cell system. The fuel supply device comprises a fuel tank storing highly concentrated fuel and a fuel deliver device delivering the highly concentrated fuel from the fuel tank to a fuel unit of the fuel cell system, the control system provide the predetermined fuel supply rate to supply the fuel that was used by fuel cell to keep the system operation stable thereof. In generally, the predetermined fuel supply rate is about 1.0-4.0 times of fuel required by the generated current of the fuel cell in a period of time. It can be generated through current integration in a period (such as 1 minutes) and then calculate the corresponding fuel that was used. The calculated fuel was multiplied by a predetermined factor (such as 1.5 in this embodiment) and supply it during the next one minute. (the fuel supply rate means the fuel amount/1 min). The fuel supply controller calculates a temperature slope of the system temperature, generates a first fuel supply rate by increasing or decreasing the predetermined fuel supply rate according to the temperature slope and the relationship of system temperature and predetermined temperature, and controls a fuel delivering rate of the fuel supply device according to the generated first fuel supply rate. The detail control method executed by fuel supply controller is described as following.

In step S30, the fuel supply rate (k) is set as a predetermined velocity (k0). In step S311, fuel supply controller determines whether the system temperature is lower than a predetermined judgment temperature TL which is a temperature lower than the predetermined working temperature Tg. If yes, the fuel supply controller further determines whether the temperature variation slope of the system temperature is larger than a predetermined value S (step S312). Otherwise, the procedure goes to step S321. In this embodiment, the working temperature of the fuel cell system is prefer to be within a temperature range with upper limit temperature Tg+DT and lower limit temperature Tg−DT, wherein DT is a temperature variation and can be set by user.

In step S321, the fuel supply controller further determines whether the system temperature is larger than a first temperature which is a temperature generated by subtracting a temperature variation DT from the predetermined working temperature Tg. If the system temperature is larger than a first temperature, the procedure goes to step S324, and if not, the procedure goes to step S322. In the step S322, the fuel supply controller further determines whether the variation slope of the system temperature is smaller than S1. If yes, the procedure goes to step S323, the fuel supply controller increases the predetermined fuel supply rate, and if not, the fuel supply controller does not change the fuel supply rate in step S327.

In step S324, the fuel supply controller further determines whether the system temperature is larger than a second temperature which is a sum of the predetermined working temperature Tg and DT. If not, the fuel supply controller does not change the fuel supply rate in step S327, and if yes, the fuel supply controller further determines whether the variation slope of the system temperature is larger than S2. If yes, the procedure goes to step S326, and the fuel supply controller decreases the predetermined fuel supply rate. If the variation slope of the system temperature is not larger than S2, the fuel supply controller does not change the fuel supply rate in step S327. Furthermore, the slope S1 and S2 can be any positive value including 0.

In step S312, if the temperature variation slope of the system temperature is not larger than a predetermined value S, the fuel supply controller increases the predetermined fuel supply rate in step S314. If the temperature variation slope of the system temperature is larger than a predetermined value S, the fuel supply controller keeps the predetermined fuel supply rate in step S313. The predetermined value S can be a number not lower than 0.

In step S33, the method delays for a predetermined time period, such as 1 second to 1 minute. After the method is halted for the predetermined time period, the method returns to step S311.

It is noted that the temperature TL is a temperature not higher than the temperature (Tg−DT). In another embodiment, TL can be the temperature (Tg−DT). For one better embodiment, the working temperature Tg is 60° C., the temperature variation ΔT is 5° C., and the TL is 50° C.

Furthermore, the predetermined working temperature can comprises a plurality of temperature stages. For example, the initial predetermined working temperature is set to 40° C., and when the system temperature exceeds 40° C. the predetermined working temperature is set to 50° C. When the system temperature exceeds 50° C., the predetermined working temperature is set to 60° C. It is noted that the temperature TL has also to be adjusted according to designer or fuel cell system requirement.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A fuel supply control method to control a fuel cell system to work in a predetermined temperature by controlling a fuel supply rate, wherein the fuel cell system comprises a fuel supply unit comprising a fuel tank storing highly concentrated fuel and a fuel deliver device delivering the highly concentrated fuel from the fuel tank to a fuel unit of the fuel cell system to replenish the used fuel and keep the fuel cell system operated at predetermined working temperature thereof, the fuel supply control method comprising:
    setting a predetermined fuel supply rate;
    setting a predetermined working temperature;
    detecting a system temperature of a fuel cell system;
    calculating a temperature variation slope of the system temperature;
    generating a first fuel supply rate by increasing or decreasing a predetermined fuel supply rate according to the relationship of system temperature and predetermined working temperature; and
    controlling a fuel delivering rate of the fuel deliver device according to the first fuel supply rate.

2. The fuel supply control method as claimed in claim 1, wherein the temperature variation slope is a slope of the system temperature versus time, and when the system temperature does not reach the predetermined working temperature and the slope is not higher than a predetermined value, the fuel supply controller adjusts the predetermined fuel supply rate by increasing the predetermined fuel supply rate to generate a first fuel supply rate.

3. The fuel supply control method as claimed in claim 2, wherein the predetermined value is larger than or equal to 0.

4. The fuel supply control method as claimed in claim 2, wherein the predetermined working temperature comprises a plurality temperature stages.

5. The fuel supply control method as claimed in claim 1, wherein when the fuel cell system starts working, the fuel deliver device first delivers a predetermined amount of fuel to the fuel cell system to speed up a temperature rising rate of the system temperature of the fuel cell system.

6. The fuel supply control method as claimed in claim 1, further comprising detecting an environmental temperature of the fuel cell, wherein the predetermined temperature is set to exceed the environmental temperature by at least 10° C.

7. The fuel supply control method as claimed in claim 1, further comprising setting a predetermined fuel supply rate which is one to four times the fuel supply rate required by the current that was generated by the fuel cell in a previous time period.

8. The fuel supply control method as claimed in claim 1, wherein the predetermined working temperature is within the predetermined temperature range, when the system temperature exceeds an upper limit of the predetermined temperature range and the temperature variation slope is positive, the fuel supply controller decreases the predetermined fuel supply rate, and when the system temperature does not reach an lower limit of the predetermined temperature range and the temperature variation slope is not positive, the fuel supply controller increases the predetermined fuel supply rate.

9. The fuel supply control method as claimed in claim 8, wherein the upper limit is a temperature sum of the predetermined working temperature and a temperature variation, the lower limit is a temperature which is generated by subtracting a temperature variation from the predetermined working temperature, and the temperature variation is smaller than 10° C.

* * * * *